United States Patent [19]

Butcher et al.

[11] Patent Number: 4,539,124
[45] Date of Patent: Sep. 3, 1985

[54] LUBRICATING SYSTEM COMPOSITION FOR EXTRUSION OF POLYVINYL CHLORIDE RESIN BINDER

[75] Inventors: Anthony V. Butcher, Liphook; Brian W. Hatt, Speen, both of England

[73] Assignee: Elkem a/s, Oslo, Norway

[21] Appl. No.: 578,828

[22] Filed: Feb. 10, 1984

[51] Int. Cl.³ ............................................. C10M 1/50
[52] U.S. Cl. ..................................... 252/28; 524/492; 524/493; 106/288 B; 428/404
[58] Field of Search ......................... 252/28; 428/404; 106/288 B; 524/492, 493

[56] References Cited

U.S. PATENT DOCUMENTS

| | | | |
|---|---|---|---|
| 3,208,823 | 9/1965 | Baker et al. | 524/493 |
| 4,301,060 | 11/1981 | Underwood et al. | 524/493 |
| 4,360,610 | 1/1983 | Murry et al. | 523/212 |

Primary Examiner—Jacqueline V. Howard
Attorney, Agent, or Firm—Lucas & Just

[57] ABSTRACT

A lubricating system composition for the extrusion of polyvinyl chloride resin conduits is provided by treating silica fume particles at least in part with a lubricant to form a premix additive for polyvinyl chloride extrusion compounds whereby the resulting product has unique and particularly advantageous physical characteristics which makes possible the reduction in wall thickness and an increase in loading of calcium carbonate to effect a material reduction in cost of manufacture.

19 Claims, 2 Drawing Figures

LUBRICATING SYSTEM COMPOSITION FOR EXTRUSION OF POLYVINYL CHLORIDE RESIN BINDER

This invention relates to a lubricating system composition and to the process of making and using the composition and in particular for the extrusion of unplasticized polyvinyl chloride thermoplastic resin (UPVC) pipe having unique and particularly advantageous characteristics.

Briefly stated, the composition of the lubricating system of the present invention comprises silica fume coated with selected lubricants which when added in combination to UPVC compounds for the extrusion of pipe improves the flow of the dry blend and provides increased impact strength and stiffness in the extruded pipe. As a result, the amount of filler may be increased and the thickness of the wall of the pipe may be reduced to reduce manufacturing cost without impairing the required impact strength characteristics.

It is well known to extrude UPVC pipe such as sewer pipe and telephone, power and communication conduits. Conventional UPVC compounds used in the extrusion process usually contain the following ingredients:

1. A thermal stabilizer such as a basic lead or tin salt;
2. An internal lubricant such as a wax of low melting point which assists the UPVC powder to fuse in the early zones of the extruder barrel and which reduces viscosity of the extrusion compound;
3. An external lubricant such as paraffin wax to provide lubrication between the melt and the metal of the extruder;
4. A pigment such as a mixture of carbon black and titanium oxide to produce desired coloring. Titanium oxide may be used alone to stabilize the conduit against ultra-violet light;
5. A filler, usually calcium carbonate which is important to reduce the cost of the compound;
6. An impact strength modifier to overcome the loss of impact strength occasioned by use of relatively high levels of calcium carbonate filler.

The chemical composition, particle size and shape of the filler is important in that the filler most frequently determines the mechanical characteristics of the conduit such as stiffness, impact strength and processing characteristics of the compound. The level of filler that can be employed is limited by a reduction in impact strength of the extruded conduit which, in general, falls below an acceptable level when the amount of the conventional calcium carbonate filler approaches and exceeds about 20 parts per hundred (phr.) in the compound. Addition of an impact strength modifier which increases impact strength may be employed to increase the amount of calcium carbonate filler up to 40 or 60 phr. but impact strength modifiers are expensive and there is little if anything to gain by using more than about 20 phr. of filler. It is also desirable to coat the calcium carbonate particles with a lubricant such as stearic acid when using a relatively large amount of the filler to improve the processing characteristics of the extrusion compound.

It has recently been suggested to replace all or part of the conventional calcium carbonate extender with particulate amorphous silica obtained by a process in which the silica is reduced and the reduction product oxidized in the vapor phase to form spherical amorphous particles containing at least about 60% of particles below about one micron in size. As described in U.S. Pat. No. 4,301,060, this particular type of silica fume will increase the impact strength of the extruded UPVC conduit and as a result the amorphous silica fume may be employed in greater than the conventional amounts of calcium carbonate extender. As described in U.S. Pat. No. 4,301,060, the amorphous silica fume may be employed with advantage in an amount of from 5 phr. up to about 250 phr. of the UPVC pipe extrusion compound and it may be used alone or in combination with conventional fillers.

It has now been discovered that the advantage of using the amorphous silica fume for extrusion of UPVC pipe is materially improved by a lubricating system composition comprising silica fume treated with one or more lubricants to at least in part coat the particles before the fume is added to the UPVC pipe extrusion compound. While the mechanism is not now completely understood, the addition of the coated silica fume to the pipe extrusion compound resulted in greater stiffness and impact strength of the extruded conduit. As a result, the wall thickness may be reduced and the impact strength maintained or even enhanced. Everything else being equal, the increase in stiffness and impact strength of the extruded conduit makes it possible to reduce the thickness of the conduit wall and still meet the required strength specifications for telephone and electrical power and communication conduits. Reduction in wall thickness reduces the cost of the conduit and furthermore use of the coated amorphous silica fume makes it possible to increase the amount of the calcium carbonate extender while maintaining the impact strength at acceptable levels. It also turned out that the precoated silica fume greatly improved processing characteristics by increasing flowability of the highly filled UPVC dry compounds resulting in minimizing the problem of bridging and 'hang up' in feed hoppers and other handling equipment.

The term silica fume used in the specification and claims means the silica fume of the present invention which is particulate amorphous silica obtained from a process in which silica is reduced and the reduction product is oxidized in vapor phase to form amorphous silica.

In a preferred embodiment the silica fume of the present invention is obtained as a by-product in the production of silicon metal or ferrosilicon in an electric reduction furnace. In these processes, fairly large quantities of silica are formed as dust which is recovered in conventional manner in filters or other collection apparatus.

The manufacture of silicon involves the reduction of silica such as quartz with carbon. Iron is added if the alloy ferrosilicon is desired. Part of the reduced silica in leaving the furnace is reoxidized in the vapor phase in air to form the fine particulate silica of the present invention. The silica fume of the present invention is composed of substantially sub-micron, spherical particles. The regular spherical shape and particle-size range, together with its chemical inertness and lack of porosity is of particular advantage for the present invention.

The silica fume particles may contain at least 86% by weight $SiO_2$ and have a real density of 2.1–2.3 g/cm$^3$ and a surface area of 15–30 m$^2$/g. The particles are substantially spherical and at least 60% by weight of the fume has a particle size of less than 1 micron. These values may of course be varied. The $SiO_2$ content may be lowered and the particle size selected by screening. The particles are generally gray due to carbon which if desired may be burned off to form white particles.

In accordance with the present invention the silica fume particles are coated with a lubricant to form the lubricating system for subsequent use in extruding UPVC conduits and in particular sewer, telephone and electrical power and communication conduits. Any conventional mixing apparatus may be employed to uniformly mix the lubricant with the finely divided silica particles to ensure a uniform distribution of the lubricant and silica fume particles in the lubricating system of the present invention. The amount of lubricant used to coat the silica fume particles will vary depending on the physical coating characteristics of the lubricant. Best results are achieved by using from about 0.25 parts by weight to about 20 parts by weight of lubricant for each 100 parts by weight of silica fume. The specified minimum amount of lubricant provides the necessary flowability in the dry blend to avoid the problem of bridging that clogs the feed hopper and other transportation equipment to the extruder barrel. The maximum amount tends to insure coating of the particles. An excess of lubricant over the specified maximum amount may be used if desired.

In accordance with the present invention, good results have been achieved by coating the silica fume particles with one or more of the known lubricants such as: hydrogenated castor oil; silicone oil for example a poly(dimethyl siloxane); trimethylolpropane; and pentaerythritol tetrastearate. If desired Resin 18 which is a poly-α-methylstyrene resin sold by Amoco Chemicals Corporation may also be included in the system to improve the fusion characteristics of the UPVC melt in the barrel of the extruder.

More specifically, the basic ingredients in the lubricating system of the present invention for best results include:

| Ingredient | Parts by Weight |
| --- | --- |
| Silica fume | 100 |
| one or more hydrogenated castor oil, silicone oil, trimethylolpropane, pentraearythritol tetrastearate | from about 0.25 to about 20.0 |
| Resin 18 | from about 0.0 to about 100.0 |

When Resin 18 is used in the system the preferred amount is from about 10 parts by weight to about 50.0 parts by weight for each 100 parts by weight of silica fume.

If desired one or more of the conventional additives may be used in the lubricating system composition but these are not necessary for achieving the advantageous results of the present invention.

The lubricating system composition of the present invention may be preformed and added directly to the UPVC extrusion compound with proper mixing in conventional manner with the other ingredients or it may be stored in silos as inventory stock to be mixed as required in the UPVC extrusion compound.

Each manufacturer of extruded UPVC sewer, telephone and electrical power and communication conduits has its own particular formulation for the UPVC extrusion compound and the amount of calcium carbonate filler, lubricants, stabilizers, pigment, impact strength modifiers in the formulation will vary within conventional known proportions.

In general, a standard formulation for extruding telephone and electrical power and communication conduits may contain the following approximate amounts of conventional ingredients:

| Ingredients | Parts by Weight |
| --- | --- |
| UPVC | 100.0 |
| Stabilizer (organic tin compound) | 0.5 |
| Calcium Stearate (lubricant) | 0.8 |
| Paraffin Wax (lubricant) | 1.0 |
| Oxidized polyethylene wax 629A | 0.15 |
| Pigment ($TiO_2$) | 1.0 |
| Calcium Carbonate (Filler) | 10–30 |

In accordance with the present invention the pretreated silica fume lubricating system is added and mixed into the known UPVC extrusion compounds as a combined filler and lubricant. Some advantange of the present invention may be achieved with only very small amounts of treated silica fume but it is preferred to use from about 5.0 to about 25 parts for each 100 parts of UPVC resin in the extrusion compound. The silica fume may be the only filler in the UPVC extrusion compound but it preferably is used in combination with other conventional filler such as calcium carbonate. Best results are achieved by using from about 5.0 parts to about 20.0 parts for each 100 parts of UPVC resin by weight in the extrusion compound and by using the silica fume in combination with the conventional calcium carbonate filler. The pretreated silica fume of the present invention may be mixed into the UPVC extrusion compound in a conventional manner as by using conventional high speed mixers.

Further details and advantages of the present invention may be readily understood by reference to the drawings which illustrate only one of the forms of apparatus that may be employed in carrying out the present invention and in which.

In this example a conventional mixer was employed such as a Littleford model W-600 high intensity mixer was employed for mixing 250 pounds of silica fume particles with 25 pounds of hydrogenated caster oil lubricant. The ingredients were charged to the mixer and mixing was allowed to continue until the temperature reached about 80° C. in about 4 to 5 minutes. The hot coated silica fume was dropped into a storage container. In this example, the ingredients were heated to 80° C. which is above the melting point of the lubricant. Lower temperatures may be employed as long as the lubricant is in the liquid state for best contact with the microsilica particles. If desired, the ingredients may be mixed in any convenient manner as for example by spraying the liquified lubricant on the microsilica particles.

In order to compare the above described silica fume particles treated with 10 percent by weight of hydrogenated castor oil lubricant of the lubricating system of the present invention to the same uncoated silica fume the following UPVC extrusion compounds were formulated:

TABLE I

| Ingredients | Parts by Weight | |
|---|---|---|
| | CW-2 Coated Silica Fume | Uncoated Silica Fume |
| UPVC Airco 1230P | 100.00 | 100.00 |
| 1928 organic tin stabilizer | 0.40 | 0.40 |
| Calcium Stearate (lubricant) | 1.20 | 1.20 |
| XL165 Paraffin wax (lubricant) | 1.10 | 1.10 |
| Hydrogenated castor oil (lubricant) | 0.00 | 1.00 |
| AC629A oxidized polyethylene wax (lubricant) | 0.25 | 0.25 |
| $TiO_2$ pigment | 1.00 | 1.00 |
| Resin 18-210 (Fusion Aid) | 5.00 | 5.00 |
| Vicron 1515 calcium carbonate | 60.00 | 60.00 |
| Hydrogenated castor oil Treated Silica Fume | 11.0 | — |
| Untreated Silica Fume | — | 10.00 |

All of the ingredients in Table I except for the treated silica fume are well-known conventional ingredients used for extruding telephone and electrical power and communication conduits. The Airco 1230 P is powdered unplasticized polyvinyl chloride resin sold by Airco Company. 1928 stabilizer is an organic tin stabilizer sold by Argos Chemical Company. XL165 is a paraffin wax sold by American Hoechst Corp. AC629A is an oxidized polyethylene wax sold by Allied Chemical Corporation. The $TiO_2$ pigment is sold by Tioxide SA. Resin 18-210 is sold by Amoco Chemical Corp. Vicron 1515 is a calcium carbonate supplied by Pfizer Chemical Corp. The calcium stearate is readily available from any number of suppliers.

Figure 1:
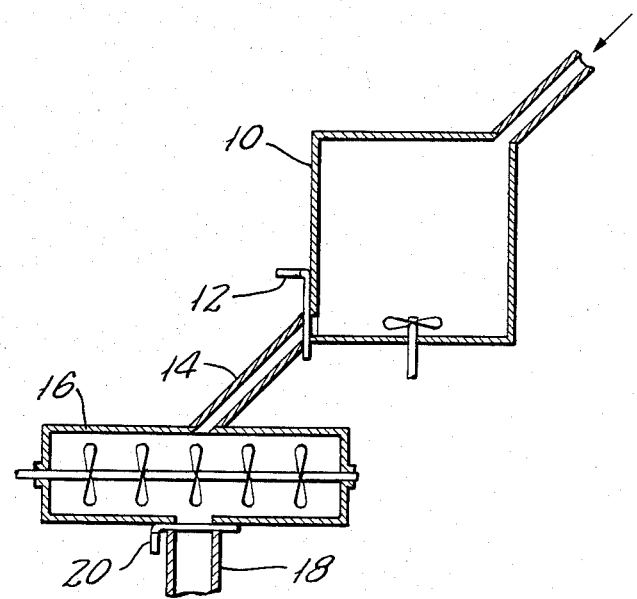
FIG. 1 illustrates a form of high speed mixer used to disperse the ingredients in the UPVC extrusion compound.

FIG. 1 illustrates the equipment used for mixing the foregoing ingredients. The mixer 10 is a conventional Littleford model W-600 high intensity mixer used in combination with a conventional Littleford K1200 water-jacketed (not shown) cooler 16.

The mixer 10 was switched on and 250 pounds of UPVC along with the stabilizer were charged to the mixer. Mixing was allowed to continue until the temperature was about 70°–80° C. The treated silica fume was added followed by the remaining ingredients except for the calcium carbonate. Mixing was allowed to continue until the temperature was about 95° C. The calcium carbonate was then added and mixing continued until the temperature reached 120° C. The hot mix was discharged through gate 12 and conduit 14 into cooler 16 where it quickly cooled to about 110° F. The cooled extrusion compound was discharged through conduit 18, gate 20 and transported to a silo and held ready for extrusion. The resulting compound was uniformly mixed and there were no such agglomerates as frequently form with untreated silica fume. The proportions of ingredients used in this Example were those set forth in Table I and the same mixing procedure was repeated for the second mix of Table I to form a second extrusion compound with the untreated silica fume.

Figure 2:
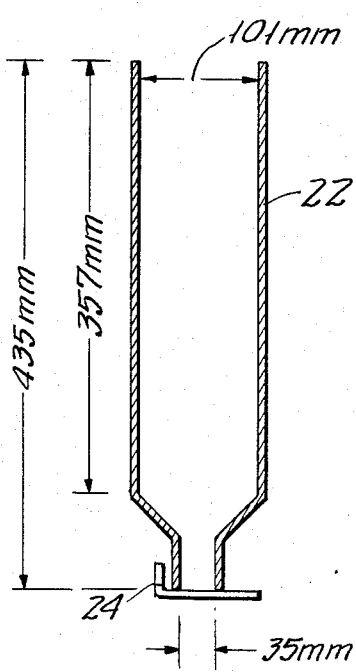
FIG. 2 illustrates a form of flowability hopper used to determine the flow characteristics of the lubricating system composition of the present invention.

Flowability of each of the dry extrusion compounds was tested at ambient temperature by charging one liter to cylindrical flowability hopper 22 (FIG. 2). The slide valve 24 was opened and the time for the compound to empty the hopper was recorded in seconds. The one liter of extrusion compound containing the treated silica fume of the present invention took 20.9 seconds while the one liter of the second extrusion compound with untreated silica fume took 29.0 seconds to empty the hopper. The flowability of the extrusion compound containing the treated silica fume was excellent and while the extrusion compound with untreated silica fume was quite good, the extrusion compound with treated silica fume provides superior flowability for subsequent processing and extrusion. The term flowability hopper used in the specification and claims means the hopper having the configuration shown in FIG. 2.

Each one of the extrusion compounds was extruded in conventional manner through the same conventional extruder to produce a 4.0 inch inside diameter conduit. The impact strength and elastic modulus of each extruded conduit was tested in accordance with the conventional ASTM procedure ASTM-D-2412. The elastic modulus of the conduit which contained the treated silica fume of the lubricating system of the present invention was 709,000 p.s.i. while the elastic modulus of the second extrusion compound containing the untreated silica fume was 665,000 p.s.i. The superiority in elastic modulus of the extruded UPVC conduit of the present invention was unexpected and as a result the thickness of the wall of the extruded conduit can be reduced to realize a material saving in cost of manufacture. It will also be noted that the amount of calcium carbonate in the extrusion compound was 60 phr. which is well above that conventionally employed and this high level of calcium carbonate loading made possible by the lubricating system of the present invention constitutes a further material reduction in manufacturing cost.

In this second example, TMP which is trimethylolpropane TMP) lubricant sold by the British Drug Houses Ltd. was employed in place of the hydrogenated castor oil lubricant. The procedure employed was the same as described hereinabove for the hydrogenated castor oil lubricant pretreating and the same procedure was employed for mixing and extruding the conduits. The proportions of ingredients are set forth in Table II which follows below. In this second example, the silica fume was treated with 1.0% by weight of TMP. The flowability of the dry extrusion compounds were determined using the flowability hopper of FIG. 2 and the above described procedure. The elastic modulus of the extruded 4 inch inside diameter conduits were determined by ASTM procedure D-2412 as described above.

TABLE II

| Ingredients | Parts by Weight | |
|---|---|---|
| | TMP Coated Silica Fume | Uncoated Silica Fume |
| UPVC Airco 1230P | 100.00 | 100.00 |
| 1928 organic tin stabilizer | 0.40 | 0.40 |
| Calcium Stearate (lubricant) | 1.20 | 1.20 |
| XL165 Paraffin wax (lubricant) | 1.10 | 1.10 |
| AC629A oxidized polyethylene wax (lubricant) | 0.25 | 0.25 |
| $TiO_2$ pigment | 1.00 | 1.00 |
| Resin 18-210 (Fusion Aid) | 5.00 | 5.00 |
| Vicron 1515 calcium carbonate | 60.00 | 60.00 |
| Treated silica fume (TMP) | 10.10 | 0.00 |

TABLE II-continued

| Ingredients | Parts by Weight | |
|---|---|---|
| | TMP Coated Silica Fume | Uncoated Silica Fume |
| Untreated silica fume | 0.00 | 10.00 |
| Elastic Modulus p.s.i. | 740,000 | 659,000 |
| Flowability (seconds) | 22.00 | 31.00 |

In this example the dry extrusion compound with untreated silica fume did not flow out of hopper 14 as readily as the treated silica fume compound. The untreated silica fume extrusion compound would be difficult to process in commercial extrusion on a production line since the compound would tend to bridge and clog the apparatus. The extrusion compound with the treated silica fume of the lubricating system of the present invention had superior flowability. Again the elastic modulus of the conduit containing treated silica fume was surprisingly high. A comparative test using the ingredients of Table II was carried out in which silicone oil was used to treat the silica fume particles in place of the TMP. The elastic modulus of the conduit with treated silica fume was about 750,000 p.s.i. and superior to that of the conduit using untreated silica fume. Conventionally, the elastic modulus of polyvinyl chloride conduits using the known calcium carbonate filler without any silica fume is about 580,000 p.s.i.

In accordance with the present invention, the increased elastic modulus makes it possible to reduce the wall thickness of extruded polyvinyl chloride resin conduits by up to about 8% while maintaining the required strength for meeting industry specifications.

It will be understood that it is intended to cover all changes and modifications of the preferred embodiment of the present invention herein chosen for the purpose of illustration which do not constitute a departure from the spirit and scope of the invention.

What is claimed is:

1. A lubricating system composition for use in polyvinyl chloride resin compounds for the extrusion of products which comprises at least about 5 parts by weight for each 100 parts by weight of polyvinyl chloride resin of finely divided silica fume particles said silica particles having a surface area between about 15 to about 30 m$^2$/g, at least about 60% by weight of said silica particles being less than about 1$\mu$ in size and said silica particles having a real density between about 2.1 to about 2.3 g/cm$^3$ treated with at least about 0.25 parts by weight for each 100 parts by weight of silica fume particles of one or more polyvinyl chloride extrusion compound lubricants.

2. The lubricating system composition of claim 1 in which the one or more lubricants are selected from the group consisting of commercial hydrogenated castor oil, silicone oil, and trimethylolpropane.

3. The lubricating system composition of claim 1 in which the lubricant is present in an amount of from about 0.25 to about 20.0 parts by weight for each 100 parts by weight of silica fume particles.

4. The lubricating system composition of claim 2 in which the composition includes a pentaerythritol tetrastearate.

5. The lubricating system composition of claim 2 in which the composition includes poly-α-methylstyrene resin as a fusion aid.

6. A lubricating system composition for use in polyvinyl chloride resin compounds for the extrusion of conduits which comprises at least about 5 parts by weight for each 100 parts by weight of polyvinyl chloride resin of silica fume particles said silica particles having a surface area between about 15 to about 30 m$^2$/g, at least about 60% by weight of said silica particles being less than about 1$\mu$ in size and said silica particles having a real density between about 2.1 to about 2.3 g/cm$^3$ coated at least in part with at least about 0.25 parts by weight for each 100 parts by weight of silica fume particles of a lubricant selected from the group consisting of commercial hydrogenated castor oil, silicone oil, and trimethylolpropane waxy solids.

7. The process of forming a lubricating system composition for addition to a polyvinyl chloride resin compound for extrusion of conduits which comprises the steps of combining at least about 0.25 parts by weight for each 100 parts by weight of silica fume particles of one or more polyvinyl chloride extrusion compound lubricants with at least about 5 parts by weight for each 100 parts by weight of polyvinyl chloride resin of silica fume particles said silica particles having a surface area between about 15 to about 30 m$^2$/g, at least about 60% by weight of said silica particles being less than about 1$\mu$ in size and said silica particles having a real density between about 2.1 to about 2.3 g/cm$^3$ and mixing the two ingredients until the individual particles of silica fume are at least in part coated with said one or more lubricants.

8. The process of claim 7 in which the one or more lubricants are selected from the group consisting of commercial hydrogenated castor oil, silicone oil, and trimethylolpropane waxy solids.

9. The process of claim 8 in which from about 0.25 to about 20.0 parts by weight of the selected one or more lubricants is present for each 100 parts by weight of the silica fume particles.

10. The process of claim 8 which includes the step of subjecting the silica fume and selected lubricant to high intensity mixing at a temperature of about 80° C. in order to at least in part coat the silica fume particles with the selected lubricant.

11. A polyvinyl chloride thermoplastic resin conduit extruded from a compound which contains polyvinyl chloride resin and as an essential ingredient a lubricating system composition comprising at least about 5 parts by weight for each 100 parts by weight of polyvinyl chloride resin of silica fume particles said silica particles having a surface area between about 15 to about 30$^2$/g, at least about 60% by weight of said silica particles being less than about 1$\mu$ in size and said silica particles having a real density between about 2.1 to about 2.3 g/cm$^3$ at least in part coated with at least about 0.25 parts by weight for each 100 parts by weight of silica fume particles of a polyvinyl chloride extrusion lubricant.

12. The polyvinyl chloride thermoplastic resin extruded conduit of claim 11 in which the lubricant is selected from the group consisting of hydrogenated castor oil, silicone oil and trimethylolpropane waxy solids.

13. A polyvinyl chloride conduit extruded from a compound containing polyvinyl chloride resin and as an essential ingredient thereof at least about 5 parts by weight for each 100 parts by weight of polyvinyl chloride resin of particles of silica fume said silica particles having a surface area between about 15 to about 30 m$^2$/g, at least about 60% by weight of said silica particles being less than about 1$\mu$ in size and said silica particles having a real density between about 2.1 to about 2.3 g/cm³ coated with at least about 0.25 parts by weight for each 100 parts by weight of silica fume particles of a lubricant selected from the group consisting of hydrogenated castor oil, silicone oil and trimethylolpropane waxy solids.

14. An extrusion compound for extruding polyvinyl chloride conduit which comprises as an essential ingredient thereof at least about 5 parts by weight for each 100 parts by weight of polyvinyl chloride resin of silica fume particles said silica particles having a surface area between about 15 to about 30 m²/g, at least about 60% by weight of said silica particles being less than about 1μ in size and said silica particles having a real density between about 2.1 to about 2.3 g/cm³ at least in part coated with at least about 0.25 parts by weight for each 100 parts by weight of silica fume particles of a polyvinyl chloride extrusion compound lubricant.

15. An extrusion compound for extruding polyvinyl chloride conduit which comprises as an essential ingredient thereof at least about 5 parts by weight for each 100 parts by weight of polyvinyl chloride resin of silica fume particles said silica particles having a surface area between about 15 to about 30 m²/g, at least about 60% by weight of said silica particles being less than about 1μ in size and said silica particles having a real density between about 2.1 to about 2.3 g/cm³ at least in part coated with at least about 0.25 parts by weight for each 100 parts by weight of silica fume particles of a lubricant selected from the group consisting of hydrogenated castor oil, silicone oil and trimethylolpropane waxy solids.

16. The process of extruding polyvinyl chloride thermoplastic resin conduits which comprises the steps of at least in part coating silica fume particles with at least about 0.25 parts by weight for each 100 parts by weight of silica fume particles of a polyvinyl chloride extrusion compound lubricant, forming an extrusion compound of polyvinyl chloride resin that includes at least about 5 parts by weight for each 100 parts by weight of polyvinyl chloride resin of said coated silica fume particles said silica particles having a surface area between about 15 to about 30 M²/g, at least about 60% by weight of said silica particles being less than about 1μ in size and said silica particles having a real density between about 2.1 to about 2.3 g/cm³, homogeneously mixing said coated silica fume particles into said extrusion compound and thereafter extruding said compound to form a conduit.

17. The process of extruding polyvinyl chloride resin conduits which comprises the steps of at least in part coating silica fume particles with at least about 0.25 parts by weight for each 100 parts by weight of silica fume particles of an internal lubricant selected from the group consisting of conventional hydrogenated castor oil, silicone oil and trimethylolpropane waxy solids, forming an extrusion compound of polyvinyl chloride resin, forming a homogeneous mixture of said resin and at least about 5 parts by weight for each 100 parts by weight of polyvinyl chloride resin of said coated silica particles said silica particles having a surface area between about 15 to about 30 m²/g, at least about 60% by weight of said silica particles being less than about 1μ in size and said silica particles having a real density between about 2.1 to about 2.3 g/cm³ and thereafter extruding a conduit.

18. A lubricating system composition for use in polyvinyl chloride resin compounds for the extrusion of products which comprises at least about 5 parts by weight for each 100 parts by weight of polyvinyl chloride resin of finely divided silica fume particles treated with at least about 0.25 parts by weight for each 100 parts by weight of silica fume particles of one or more polyvinyl chloride extrusion compound lubricants and a fusion aid.

19. The lubricating system composition of claim 18 in which the one or more lubricants are selected from the group consisting of commercial hydrogenated castor oil, silicone oil, and trimethylolpropane.

* * * * *